(12) United States Patent
Bahattab et al.

(10) Patent No.: US 8,609,749 B1
(45) Date of Patent: Dec. 17, 2013

(54) METHOD FOR PREPARING A POLYURETHANE-CARBON NANOTUBE BASED COATING COMPOSITION

(71) Applicant: King Abdul Aziz City for Science and Technology (KACST), Riyadh (SA)

(72) Inventors: Mohammed Abdullah Bahattab, Riyadh (SA); Musarrat Husain Jafri, Riyadh (SA); Andrei V. Krauklis, Minsk (BY); Siarhei Zhdanok, Minsk (BY)

(73) Assignee: King Abdulaziz City for Science and Technology (KACST), Riydah (SA)

( * ) Notice: Subject to any disclaimer, the term of this patent is extended or adjusted under 35 U.S.C. 154(b) by 0 days.

(21) Appl. No.: 13/663,374

(22) Filed: Oct. 29, 2012

(51) Int. Cl.
*B01F 3/08* (2006.01)
(52) U.S. Cl.
USPC ........... 523/322; 523/300; 523/319; 524/495; 524/496
(58) Field of Classification Search
USPC .................................. 523/300; 524/495, 496
See application file for complete search history.

(56) References Cited

U.S. PATENT DOCUMENTS

2013/0126216 A1* 5/2013 Khosla et al. ................ 174/254

* cited by examiner

*Primary Examiner* — Edward Cain
(74) *Attorney, Agent, or Firm* — Timberline Patent Law Group PLLC

(57) ABSTRACT

The invention provides a method for preparing a Polyurethane-Carbon Nanotube (PU-CNT) based coating composition. More specifically, the invention provides a method for preparing a PU-CNT based anti-corrosive coating composition. The method comprises preparing a dispersion comprising one or more types of Carbon Nanotubes (CNTs). The dispersion is prepared by dispersing the one or more types of CNTs in a dispersant comprising at least one polar solvent and at least one surfactant. The method further comprises mechanically mixing a hardener with the dispersion comprising the one or more types of CNTs. In addition, the method comprises mechanically mixing polyurethane with the dispersion prepared by mechanically mixing the hardener with the dispersion comprising the one or more types of CNTs.

16 Claims, 1 Drawing Sheet

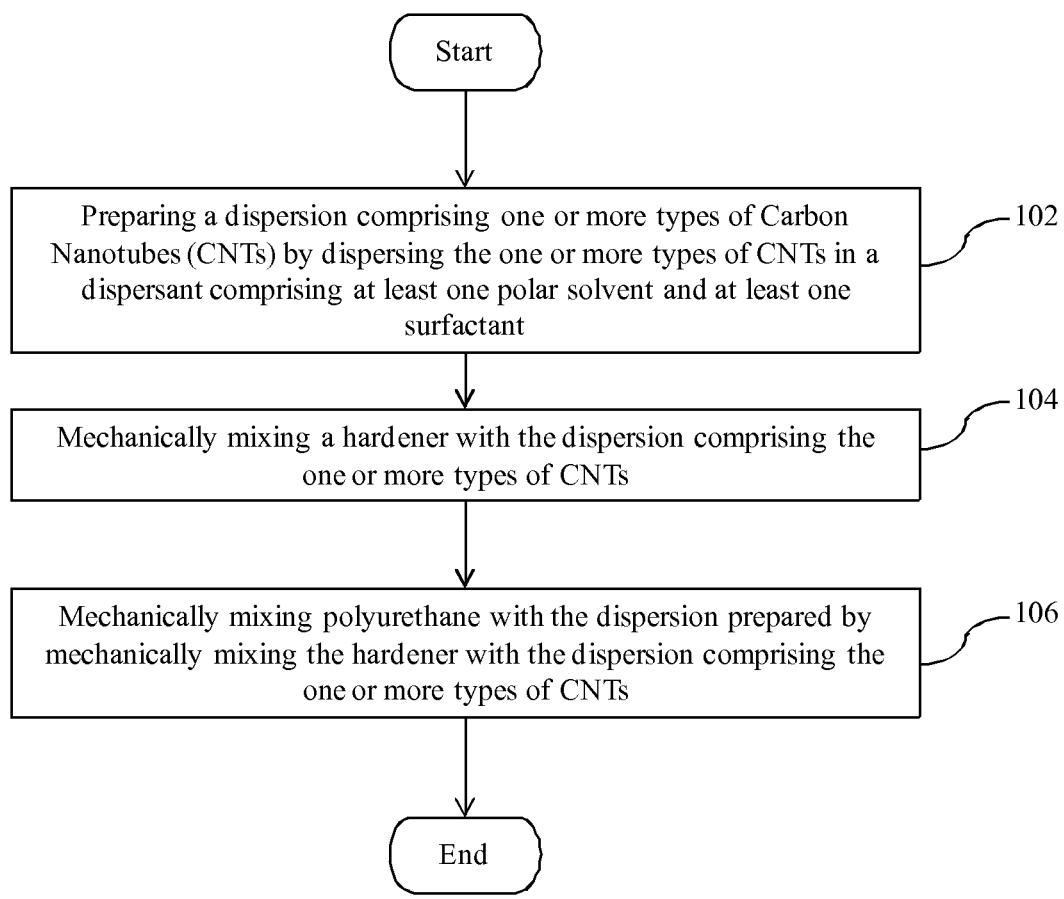

METHOD FOR PREPARING A POLYURETHANE-CARBON NANOTUBE BASED COATING COMPOSITION

FIELD OF THE INVENTION

The invention generally relates to a method for preparing a coating composition. More specifically, the invention relates to a method for preparing a polyurethane-carbon nanotube based coating composition.

BACKGROUND OF THE INVENTION

Polyurethane (PU) exhibits excellent chemical and mechanical properties because of which it is widely used for coating various materials. PU when mixed with Carbon Nanotubes (CNTs) exhibits even better properties, and accordingly a lot of methods have been developed for preparing Polyurethane-Carbon Nanotube (PU-CNT) composites.

The properties exhibited by the PU-CNT composites vary depending on the method used for preparing them. For example, a PU-CNT composite prepared using an extrusion process exhibits superior tensile strength and elongation at break. Similarly, a PU-CNT composite prepared using a solvent casting method provides a softer and more ductile PU. There are numerous such methods known in the art for preparing PU-CNT composites for use in different applications, wherein the method used for preparing the PU-CNT composites depends on the properties required in the corresponding application. For example, a PU-CNT composite prepared using a direct method of spinning can be used for electromagnetic interference shielding.

There are however limited methods for preparing PU-CNT based coating compositions. Further, the PU-CNT composites prepared using such methods exhibit only a few of the desired properties such as, but not limited to, superior impedance and mechanical properties. However, coating compositions are required to have various superior properties in combination.

In view of the above, there is a need for an improved method for preparing PU-CNT based coating compositions.

BRIEF DESCRIPTION OF THE FIGURE

The accompanying FIGURE together with the detailed description below forms part of the specification and serves to further illustrate various embodiments and to explain various principles and advantages all in accordance with the present invention.

FIG. 1 illustrates a flow diagram of a method for preparing a Polyurethane-Carbon Nanotube (PU-CNT) based coating composition in accordance with an embodiment of the invention.

DETAILED DESCRIPTION OF THE INVENTION

Before describing in detail embodiments that are in accordance with the invention, it should be observed that the embodiments reside primarily in method steps related to preparing a polyurethane-carbon nanotube based coating composition. Accordingly, the method steps have been represented where appropriate by conventional symbols in the drawings, showing only those specific details that are pertinent to understanding the embodiments of the invention so as not to unnecessarily obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, apparatus or composition that comprises a list of elements does not include only those elements but may include other elements not expressly listed or inherent to such process, method, article, apparatus or composition. An element proceeded by "comprises . . . a" does not, without more constraints, preclude the existence of additional identical elements in the process, method, article, apparatus or composition that comprises the element.

Generally speaking, pursuant to various embodiments, the invention provides a method for preparing a polyurethane-carbon nanotube based coating composition. The method comprises preparing a dispersion comprising one or more types of carbon nanotubes by dispersing the one or more types of carbon nanotubes in a dispersant comprising at least one polar solvent and at least one surfactant. The method further comprises mechanically mixing a hardener with the dispersion comprising the one or more types of carbon nanotubes. In addition, the method comprises mechanically mixing polyurethane with the dispersion prepared by mechanically mixing the hardener with the dispersion comprising the one or more types of carbon nanotubes.

FIG. 1 illustrates a flow diagram of a method for preparing a Polyurethane-Carbon Nanotube (PU-CNT) based coating composition in accordance with an embodiment of the invention.

At step 102, a dispersion comprising one or more types of Carbon Nanotubes (CNTs) is prepared. In accordance with the embodiment, multi-walled CNTs are used for preparing the dispersion. Any other suitable type of CNTs can also be used for preparing the dispersion. For example, single-walled CNTs or a combination of single-walled and multi-walled CNTs can be used for preparing the dispersion. Various two or more types of CNTs such as, but not limited to, single-walled CNTs and multi-walled CNTs can be used for preparing the dispersion. In an embodiment of the invention, the one or more types of CNTs are prepared using one of an arc discharge technique and a Floating Catalyst Chemical Vapor Deposition (FC-CVD) technique. However, any other suitable technique such as, but not limited to, laser ablation, Chemical Vapor Deposition (CVD) technique, solar energy, DC electric arc, three-phase AC arc plasma, can be used for preparing the one or more types of CNTs and as such those techniques would be apparent to those ordinarily skilled in the art.

The dispersion is prepared by dispersing the one or more types of CNTs in a dispersant comprising at least one polar solvent and at least one surfactant. The dispersion comprising the one or more types of CNTs can be prepared using various methods such as, but not limited to, mechanical mixing, ultrasonic treatment and non-ionic surfactant. The dispersant can be prepared using one or more polar solvents such as, but not limited to, water, methanol, isopropyl alcohol, n-propyl alcohol, ethanol, methyl-ethyl ketone and acetone; and one or more surfactants such as, but not limited to, polyvinylpyrrolidone (PVP), polyethylene glycol alkylphenyl ether (OP-10), ethoxylated nonylphenol (Neonol) and polyethylene glycol sorbitan monolaurate (TWEEN 20®). The dispersant can be prepared using different combinations of polar solvents and surfactants. For example, the dispersant can be prepared using methanol and PVP. Similarly, the dispersant can be prepared using neonol and acetone. It would be apparent to those ordinarily skilled in the art that the polar solvents and the surfactants used for preparing the dispersant need not be limited to the polar solvents and surfactants listed above and that the dispersant can be prepared using other suitable polar solvents and surfactants.

In an embodiment of the invention, the dispersion comprising the one or more types of CNTs is prepared by mechanically mixing the one or more types of CNTs with the dispersant. The one or more types of CNTs can be mechanically mixed with the dispersant in a mechanical mixing device. Any suitable mechanical mixing device can be used for mechanically mixing the one or more CNTs with the dispersant. For example, mechanical mixing devices such as, but not limited to, magnetic stirring plates and motor-driven stirring blades can be used for mechanically mixing the one or more CNTs with the dispersant. In accordance with the embodiment, the one or more types of CNTs are mechanically mixed with the dispersant for a period of about 5 minutes to about 20 minutes at a speed of about 500 rotations per minute (rpm) to about 3000 rpm. For example, the one or more types of CNTs are mixed with the dispersant in the mechanical mixing device for 10 minutes at 1200 rpm. It will be apparent to those ordinarily skilled in the art that the time duration for which the one or more types of CNTs are mixed with the dispersant and the speed at which the mixing is performed need not be limited to the values provided above.

In an embodiment of the invention, the dispersion comprising the one or more types of CNTs is prepared by treating the one or more types of CNTs with the dispersant in an ultrasonic bath. The one or more types of CNTs can be treated with the dispersant in any suitable ultrasonic dispersion device such as, but not limited to, a double sonication system and an ultrasonic probe. In accordance with the embodiment, the one or more types of CNTs are treated with the dispersant in the ultrasonic bath for a period of about 5 minutes to about 20 minutes. Further, the one or more types of CNTs are treated with the dispersant in the ultrasonic bath at a temperature of about 20° C. to about 27° C. In addition, the one or more types of CNTs are treated with the dispersant in the ultrasonic bath at a frequency of about 22 kilohertz (KHz) and at a power density of about 0.12 kilowatt per cubic decimeter (KWt/dm$^3$). For example, the one or more types of CNTs are treated with the dispersant in the ultrasonic bath for 10 minutes at a temperature of 23° C., wherein the frequency is 22 KHz and the ultrasonic bath is operated at a power density of 0.12 KWt/dm$^3$. It would be apparent to those ordinarily skilled in the art that the parameters for treating the dispersion in the ultrasonic bath need not be limited to the values provided above.

At step 104, the dispersion comprising the one or more types of CNTs prepared at step 102 is mechanically mixed with a hardener. The dispersion can be mechanically mixed with the hardener in a mechanical mixing device. In an embodiment of the invention, the hardener is a hardener used in making a two pack polyurethane based coating composition such as, but not limited to, Hardtop XP® hardener and Sip-Line 657® hardener. Any other suitable type of hardener can be used at step 104 and as such the hardeners which can be used would be apparent to those ordinarily skilled in the art.

In an embodiment of the invention, the hardener is mechanically mixed with the dispersion comprising the one or more types of CNTs for a period of about 5 minutes to about 20 minutes at a speed of about 500 rpm to about 3000 rpm. It will be apparent to those ordinarily skilled in the art that the time duration for which the dispersion comprising the one or more types of CNTs is mixed with the hardener and the speed at which the mixing is performed need not be limited to the values provided above.

At step 106, Polyurethane (PU) is mechanically mixed with the dispersion prepared by mechanically mixing the hardener with the dispersion comprising the one or more types of CNTs. PU can be mechanically mixed with the dispersion prepared at step 104 in a mechanical mixing device. In an embodiment of the invention, the PU is a PU used in making the two pack PU based coating composition such as, but not limited to, Hardtop XP® PU or Sip-Line 657® PU. Any other suitable type of PU can be used at step 106 and as such the PU which can be used would be apparent to those ordinarily skilled in the art.

In an embodiment of the invention, the PU is mechanically mixed with the dispersion prepared at step 104 for a period of about 5 minutes to about 20 minutes at a speed of about 500 rpm to about 3000 rpm. It will be apparent to those ordinarily skilled in the art that the time duration for which the dispersion prepared at step 104 is mixed with the PU and the speed at which the mixing is performed need not be limited to the values provided above.

The following describes an example of preparing a PU-CNT based coating composition using the method described above in accordance with an embodiment of the invention. In accordance with the embodiment, a dispersion comprising one or more types of CNTs is prepared by dispersing the one or more types of CNTs in a dispersant comprising at least one polar solvent and at least one surfactant. The one or more types of CNTs are dispersed in the dispersant by mechanically mixing the one or more types of CNTs with the dispersant. In accordance with the embodiment, the one or more types of CNTs are mechanically mixed with the dispersant for a period of 15 minutes at a speed of 2000 rpm. The dispersion comprising the one or more CNTs is mechanically mixed with a hardener for a period of 15 minutes at a speed of 2000 rpm. Thereafter, PU is mechanically mixed with the dispersion prepared by mechanically mixing the hardener with the dispersion comprising the one or more types of CNTs for a period of 5 minutes at a speed of 500 rpm to obtain the PU-CNT based coating composition.

The following describes another example of preparing a PU-CNT based coating composition using the method described above in accordance with an embodiment of the invention. In accordance with the embodiment, a dispersion comprising one or more types of CNTs is prepared by dispersing the one or more types of CNTs in a dispersant comprising at least one polar solvent and at least one surfactant. The one or more types of CNTs are dispersed in the dispersant by treating the one or more types of CNTs with the dispersant in an ultrasonic bath. In accordance with the embodiment, the one or more types of CNTs are treated with the dispersant in the ultrasonic bath for a period of 15 minutes. The treatment is performed at a temperature of 23° C. In addition, the treatment is performed at a frequency of 22 KHz and at a power density of 0.12 KWt/dm$^3$ to obtain the dispersion comprising the one or more CNTs. The dispersion comprising the one or more CNTs is mechanically mixed with a hardener for a period of 15 minutes at a speed of 2000 rpm. Thereafter, PU is mechanically mixed with the dispersion prepared by mechanically mixing the hardener with the dispersion comprising the one or more types of CNTs for a period of 5 minutes at a speed of 500 rpm to obtain the PU-CNT based coating composition.

The method described above can be used for preparing different PU-CNT based coating compositions. In an embodiment, the method is used for preparing a PU-CNT based coating composition comprising less than or equal to 0.1 weight percentage (wt %) of CNTs. For example, the method described above can be used for preparing PU-CNT based coating compositions comprising 0.05 wt % of multi-walled CNTs. Alternately, the method can be used for preparing PU-CNT based coating compositions comprising 0.08 wt % of multi walled CNTs. It would be apparent to those ordinarily skilled in the art that the method is not limited to preparing PU-CNT based coating compositions described in the embodiments above and numerous variations would be readily apparent to those ordinarily skilled in the art.

with 100 ml of a Sip-Line 657® polyurethane base for a period of 5 minutes and at a speed of 500 rpm.

Working Example 3

A dispersion comprising CNTs was prepared by mechanically mixing 0.05 gm of CNTs in a dispersant comprising of 10 ml of acetone and 5 ml of neonol surfactant for a period of 15 minutes and at a speed of 2000 rpm. The prepared dispersion was mechanically mixed with 25 ml of a Hardtop XP® hardener for a period of 15 minutes and at a speed of 2000 rpm. Thereafter, the prepared dispersion was mechanically mixed with 250 ml of a Hardtop XP® polyurethane base for a period of 5 minutes and at a speed of 500 rpm.

Various PU-CNT based coating compositions comprising different weight percentage (wt. %) of CNTs were prepared using the method described above. Table 1 provides details about some of the PU-CNT based coating compositions prepared using the method described above.

TABLE 1

| | | Carbon Nanotubes (CNTs) | | |
|---|---|---|---|---|
| Code | Type of Polyurethane (PU) | Weight Percentage of CNTs | Technique used to prepare CNTs | Method used to mix CNTs in a dispersant |
| PU | Hardtop XP ® | 0 | Arc discharge | Mechanical mixing |
| PU1 | Hardtop XP ® | 0.05 | Arc discharge | Mechanical mixing |
| PU2 | Hardtop XP ® | 0.05 | Arc discharge | Ultrasonic bath |
| PU3 | Hardtop XP ® | 0.10 | Arc discharge | Ultrasonic bath |
| PU4 | Hardtop XP ® | 0.05 | Arc discharge | Ultrasonic bath |
| PU5 | Hardtop XP ® | 0.025 | FC-CVD | Mechanical mixing |
| PU6 | Hardtop XP ® | 0.05 | FC-CVD | Mechanical mixing |
| PU7 | Hardtop XP ® | 0.025 | Arc discharge | Mechanical mixing |
| PU8 | Hardtop XP ® | 0.05 | Arc discharge | Mechanical mixing |
| PU9 | Hardtop XP ® | 0.10 | Arc discharge | Mechanical mixing |
| PU10 | Sip-Line 657 ® | 0.0 | Arc discharge | Mechanical mixing |
| PU11 | Sip-Line 657 ® | 0.05 | Arc discharge | Ultrasonic bath |
| PU12 | Sip-Line 657 ® | 0.10 | Arc discharge | Ultrasonic bath |

The method described above was used for preparing different PU-CNT based coating compositions. The following description provides some working examples related to preparing the different PU-CNT based coating compositions.

Working Example 1

A dispersion comprising CNTs was prepared by treating 0.025 gm of CNTs in a dispersant comprising of 10 milliliters (ml) of acetone and 5 ml of neonol surfactant in an ultrasonic bath for a period of 15 minutes. The prepared dispersion was mechanically mixed with 25 ml of a Hardtop XP® hardener for a period of 15 minutes and at a speed of 2000 rpm. Thereafter, the prepared dispersion was mechanically mixed with 250 ml of a Hardtop XP® polyurethane base for a period of 5 minutes and at a speed of 500 rpm.

Working Example 2

A dispersion comprising CNTs was prepared by treating 0.05 gm of CNTs in a dispersant comprising of 20 ml of acetone and 5 ml of neonol surfactant in an ultrasonic bath for a period of 15 minutes. The prepared dispersion was mechanically mixed with 100 ml of a Sip-Line 657® hardener for a period of 15 minutes and at a speed of 2000 rpm. Thereafter, the prepared dispersion was mechanically mixed One or more of the PU-CNT based coating compositions prepared using the method described above were used for coating surface of glass or metal panels for characterization of various properties of the PU-CNT based coating compositions. The hardness of the coating compositions was determined using a pendulum oscillation technique according to ASTM D4366. The abrasion resistance of the coating compositions was determined according to ASTM D2228 by a Taber® abrader using 500-1500 cycles of 1 kilogram (kg) load on the coated surface. The gloss of the coated surface was also measured before and after abrasion at 20° and 60°. The stretch resistance of the coating compositions was determined according to ASTM D335 by a cross-cut at 1 millimeter (mm) apart and an adhesion test with an adhesive tape. The impact resistance of the coating compositions was determined according to ASTM D2794 using a Gardner Heavy Weight Duty Variable Height Impact Tester (model IG-1120 developed by Gardco®) by dropping a load of 2 kg from a height of 120 cm. The chemical resistance of the coating compositions was determined using acid and alkali solutions on the coated surface of glass or metal panels. The results of the tests used to characterize various properties of the PU-CNT based coating compositions are provided in Table 2. Table 2 provides data regarding tests performed on surface of glass or metal panels coated with the PU-CNT based coating compositions enlisted in Table 1.

TABLE 2

| Code | Pendulum oscillation technique (No. of oscillation) | Abrasion after 1500 cycles | | Adhesion (%) Cross-cut method | Chemical resistance | | Impact resistance 2 kg load dropped from 120 cm fall |
|---|---|---|---|---|---|---|---|
| | | Area abraded (%) | Gloss loss (%) | | $H_2SO_4$ (10%) | NaOH (10%) | |
| PU | 134 | 0.28 | 81 | 90 | Pass | Pass | Failed |
| PU1 | 85 | 0.23 | 74 | 95 | Pass | Pass | Pass |
| PU2 | 95 | 0.17 | 80 | 100 | Pass | Pass | Pass |
| PU3 | 111 | 0.34 | 68 | 95 | Pass | Pass | Pass |
| PU4 | 115 | 0.31 | 73 | 85 | Pass | Pass | Pass |
| PU5 | 104 | 0.18 | 77 | 100 | Pass | Pass | pass |
| PU6 | 101 | 0.21 | 27 | 65 | Pass | Pass | pass |
| PU7 | 70 | 0.22 | 86 | 85 | Pass | Pass | Pass |
| PU8 | 100 | 0.22 | 66 | 95 | Pass | Pass | Pass |
| PU9 | 120 | 0.30 | 70 | 95 | Pass | Pass | Failed |
| PU10 | 224 | 0.023 | 66 | 95 | Pass | Pass | Pass |
| PU11 | 230 | 0.002 | 67 | 100 | Pass | Pass | Pass |
| PU12 | 234 | 0.005 | 75 | 100 | Pass | Pass | Pass |

The PU-CNT based coating compositions prepared using the method described above were used for coating steel plates to evaluate impedance, corrosion and blistering of the coating compositions. The corrosion resistance of the coating compositions was determined by a salt spray fog chamber method according to ASTM D117. The corrosion of the coating compositions was evaluated at scribed and unscribed marks using ASTM D1654. The degree of blistering of the coating compositions was evaluated by using ASTM D714-87. The corrosion test was also performed in aqueous NaCl (3.5 wt. %) solution using impedance spectroscopy electrochemical analysis technique. The results of the tests for evaluating impedance, corrosion and blistering of the PU-CNT based coating compositions coated of steel plates are provided in Table 3. Table 3 provides data regarding tests performed on steel plates coated with some of the PU-CNT based coating compositions enlisted in Table 1.

TABLE 3

| Code | Impedance (24 hours) | Rating at scribed area | Rating at unscribed area | Degree of blistering |
|---|---|---|---|---|
| PU | $1 \times 10^6$ | 8 | 8 | Few blisters |
| PU5 | $7 \times 10^8$ | 10 | 10 | No blisters |
| PU6 | $7 \times 10^7$ | 10 | 10 | No blisters |
| PU7 | $1 \times 10^8$ | 8 | 9 | Few blisters |
| PU8 | $4 \times 10^7$ | 8 | 9 | Few blisters |
| PU9 | $8 \times 10^7$ | 10 | 10 | No blisters |

The method described above produces PU-CNT based coating compositions with significantly improved properties. This is because the method causes the CNTs to fill the pores or gaps existing in the PU. Various experiments and investigations have been performed on the PU-CNT based coating compositions prepared using the method described above. The experiments and investigations include, but are not limited to, tests for determining corrosion resistance, abrasion resistance, adhesion, impact resistance, and electrical impedance of the PU-CNT based coating compositions. The tests revealed that the PU-CNT based coating compositions obtained using the method described above exhibit excellent anti-corrosion, electrochemical impedance, impact resistance, resistance from blistering due to corrosion, abrasion resistance and chemical resistance properties.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and FIGURE are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for preparing a Polyurethane-Carbon Nanotube (PU-CNT) based coating composition comprising:
    preparing a dispersion comprising one or more types of Carbon Nanotubes (CNTs) by dispersing the one or more types of CNTs in a dispersant comprising at least one polar solvent and at least one surfactant;
    mechanically mixing a hardener with the dispersion comprising the one or more types of CNTs; and
    mechanically mixing polyurethane with the dispersion prepared by mechanically mixing the hardener with the dispersion comprising the one or more types of CNTs.

2. The method of claim 1, wherein the one or more CNTs are synthesized using at least one of an arc discharge technique and a floating catalyst chemical vapor deposition technique.

3. The method of claim 1, wherein the dispersion comprising the one or more types of CNTs is prepared by mechanically mixing the one or more types of CNTs with the dispersant.

4. The method of claim 3, wherein the one or more types of CNTs is mechanically mixed with the dispersant for a period of about 5 minutes to about 20 minutes.

5. The method of claim 3, wherein the one or more types of CNTs is mechanically mixed with the dispersant at a speed of about 500 rotations per minute (rpm) to about 3000 rpm.

6. The method of claim 1, wherein the dispersion comprising the one or more types of CNTs is prepared by treating the one or more types of CNTs with the dispersant in an ultrasonic bath.

7. The method of claim 6, wherein the one or more types of CNTs is treated with the dispersant in the ultrasonic bath for a period of about 5 minutes to about 20 minutes.

8. The method of claim 6, wherein the one or more types of CNTs is treated with the dispersant in the ultrasonic bath at a temperature of about 20° C. to about 27° C.

9. The method of claim 6, wherein the one or more types of CNTs is treated with the dispersant in the ultrasonic bath at a frequency of about 22 kilohertz.

10. The method of claim 6, wherein the one or more types of CNTs is treated with the dispersant in the ultrasonic bath at power density of about 0.12 kilowatt per cubic decimeter.

11. The method of claim 1, wherein the hardener is mechanically mixed with the dispersion comprising the one or more types of CNTs for a period of about 5 minutes to about 20 minutes.

12. The method of claim 1, wherein the hardener is mechanically mixed with the dispersion comprising the one or more types of CNTs at a speed of about 500 rpm to about 3000 rpm.

13. The method of claim 1, wherein the polyurethane is mechanically mixed with the dispersion prepared by mechanically mixing the hardener with the dispersion comprising the one or more types of CNTs for a period of about 5 minutes to about 20 minutes.

14. The method of claim 1, wherein the polyurethane is mechanically mixed with the dispersion prepared by mechanically mixing the hardener with the dispersion comprising the one or more types of CNTs at a speed of about 500 rpm to about 3000 rpm.

15. A Polyurethane-Carbon Nanotube (PU-CNT) based coating composition prepared using a method comprising:
preparing a dispersion comprising one or more types of Carbon Nanotubes (CNTs) by dispersing the one or more types of CNTs in a dispersant comprising at least one polar solvent and at least one surfactant;
mechanically mixing a hardener with the dispersion comprising the one or more types of CNTs; and
mechanically mixing polyurethane with the dispersion prepared by mechanically mixing the hardener with the dispersion comprising the one or more types of CNTs.

16. The coating composition of claim 15, wherein the weight percentage (wt %) of the one or more types of CNTs in the PU-CNT based coating composition is less than or equal to 0.1.

* * * * *